(12) United States Patent
Long

(10) Patent No.: US 9,663,132 B2
(45) Date of Patent: May 30, 2017

(54) CARRYING CART ACCOMMODATION FOR SPECIAL-NEEDS RIDER

(76) Inventor: Drew Ann Long, Alabaster, AL (US)

(*) Notice: Subject to any disclaimer, the term of this patent is extended or adjusted under 35 U.S.C. 154(b) by 0 days.

(21) Appl. No.: 13/159,053

(22) Filed: Jun. 13, 2011

(65) Prior Publication Data
US 2011/0304110 A1 Dec. 15, 2011

Related U.S. Application Data

(60) Provisional application No. 61/354,353, filed on Jun. 14, 2010.

(51) Int. Cl.
B62B 3/00 (2006.01)
B62B 3/14 (2006.01)
(Continued)

(52) U.S. Cl.
CPC .............. B62B 3/1452 (2013.01); A61G 5/00 (2013.01); A61G 5/1091 (2016.11); B62B 5/067 (2013.01); B62B 5/085 (2013.01)

(58) Field of Classification Search
CPC ........... B62B 3/02; B62B 3/14; B62B 3/1444; B62B 3/1452; B62B 3/1492; B62B 5/066;
(Continued)

(56) References Cited

U.S. PATENT DOCUMENTS 2,443,236 A * 6/1948 Gallagher .................. 280/47.35
3,524,512 A * 8/1970 Barnowsky ............. B62B 5/002
180/14.1
(Continued)

FOREIGN PATENT DOCUMENTS

DE 29813154 U1 12/1998
WO PCT/AU1995/000195 10/1995
(Continued)

OTHER PUBLICATIONS

European Patent Office, Extended European Search Report for European patent application serial number 11796252.2.
(Continued)

Primary Examiner — J. Allen Shriver, II
Assistant Examiner — Travis Coolman
(74) Attorney, Agent, or Firm — The Van Winkle Law Firm; William G. Heedy; David M. Carter

(57) ABSTRACT

In one aspect, the instant disclosure provides a cart including a push handle moveable from a first position to a second position; and a chair which further includes (i) a seat facing the push handle, the seat further comprising an abduction block; (ii) a safety belt; (iii) a backrest extending upwardly from the seat; and (iv) a foot rest and one or more wheels. In another aspect, a shopping cart suitable for carrying a special needs rider is provided including a generally rectangular cargo basket, four swiveling wheels, a chair further comprising: a rearwardly facing seat further comprising an abduction block, said seat inclined at approximately a five degree angle from a horizontal axis downwardly toward a backrest, which backrest extends generally upward from the seat and is reclined at approximately a five degree angle from a vertical axis, a five point restraint safety belt and a foot rest positioned to support the rider's feet when positioned in the seat; one or more push handle moveable from a first position to a second position by pivoting around a roughly horizontal axis; and two load bearing wheels positioned substantially in the same vertical plane as the rider.

20 Claims, 9 Drawing Sheets

(51) Int. Cl.
*A61G 5/00* (2006.01)
*B62B 5/06* (2006.01)
*B62B 5/08* (2006.01)
*A61G 5/10* (2006.01)

(58) Field of Classification Search
CPC .......... B62B 5/067; B62B 5/08; B62B 5/082; B62B 5/085
USPC .................. 280/47.34, 47.39, 47.36, 47.371, 280/33.991–993, 33.995, 655.1
See application file for complete search history.

(56) References Cited

U.S. PATENT DOCUMENTS

| | | | |
|---|---|---|---|
| 3,694,029 A * | 9/1972 | Noble et al. .................. 297/467 |
| 3,796,439 A * | 3/1974 | Perego .......................... 280/644 |
| 3,999,774 A * | 12/1976 | Rehrig .................... 280/33.991 |
| 4,065,142 A * | 12/1977 | Rehrig .................... 280/33.993 |
| 4,116,456 A | 9/1978 | Stover |
| 4,176,849 A * | 12/1979 | Rehrig .................... 280/33.993 |
| 4,381,870 A | 5/1983 | Muellner |
| 4,650,199 A * | 3/1987 | Rehrig .................... 280/33.997 |
| 4,685,688 A | 8/1987 | Edwards |
| 4,733,877 A | 3/1988 | Pastien |
| 5,069,465 A * | 12/1991 | Stryker et al. .......... 280/47.371 |
| 5,249,438 A * | 10/1993 | Rhaney et al. .............. 62/457.7 |
| D343,257 S | 1/1994 | DiFloria |
| 5,318,311 A * | 6/1994 | Bofill ............................. 280/30 |
| 5,641,200 A * | 6/1997 | Howell .................... 297/256.17 |
| 5,823,548 A | 10/1998 | Reiland |
| 5,848,797 A * | 12/1998 | Paez ........................ 280/33.993 |
| 5,882,021 A | 3/1999 | Reiland |
| 5,918,891 A | 7/1999 | Russell |
| 5,961,133 A * | 10/1999 | Perry ....................... 280/33.993 |
| 6,022,031 A | 2/2000 | Reiland |
| 6,101,678 A * | 8/2000 | Malloy et al. .................. 16/438 |
| 6,237,924 B1 * | 5/2001 | Reiland et al. .......... 280/33.993 |
| 6,270,093 B1 * | 8/2001 | Johnson et al. ......... 280/33.993 |
| 6,364,326 B1 | 4/2002 | Reiland |
| 6,572,122 B2 * | 6/2003 | Johnson et al. ......... 280/33.993 |
| 6,695,325 B2 * | 2/2004 | Carrillo ...................... 280/47.34 |
| 6,722,689 B2 * | 4/2004 | Kreamer .............. A63B 21/023 280/47.38 |
| 7,063,337 B2 | 6/2006 | Russell |
| 7,182,350 B1 * | 2/2007 | Liao .......................... 280/47.34 |
| 7,237,782 B2 | 7/2007 | Tucker et al. |
| 7,287,764 B2 | 10/2007 | Russell |
| 7,350,788 B2 * | 4/2008 | Booker .................... 280/33.993 |
| 7,407,169 B2 | 8/2008 | Splain et al. |
| 7,484,740 B2 * | 2/2009 | Miller ...................... 280/87.021 |
| 7,497,448 B2 * | 3/2009 | Brown ....................... 280/47.34 |
| 8,002,290 B2 * | 8/2011 | Russell et al. ........... 280/33.993 |
| 8,251,457 B2 * | 8/2012 | Britton et al. ................. 297/467 |
| 8,342,604 B2 * | 1/2013 | Heisey et al. .............. 297/256.1 |
| 8,632,080 B2 * | 1/2014 | Russell et al. ........... 280/33.993 |
| 9,321,473 B2 * | 4/2016 | Kiser, III .................. B62B 3/00 |
| 2003/0132614 A1 | 7/2003 | Kreamer |
| 2003/0205873 A1 * | 11/2003 | Orozco .................... 280/33.991 |
| 2006/0027984 A1 * | 2/2006 | Huang ..................... 280/47.371 |
| 2006/0186620 A1 | 8/2006 | Tucker et al. |
| 2007/0063462 A1 | 3/2007 | Splain et al. |
| 2011/0057491 A1 * | 3/2011 | Nolan ...................... 297/256.15 |
| 2016/0016600 A1 * | 1/2016 | Kiser, III .................. B62B 3/00 280/47.35 |

FOREIGN PATENT DOCUMENTS

| | | |
|---|---|---|
| WO | WO 9526897 | 10/1995 |
| WO | 2005108182 A2 | 11/2005 |
| WO | 2007062460 A1 | 6/2007 |
| WO | PCT/US11/040211 | 6/2011 |

OTHER PUBLICATIONS

Coles Additional Needs Trolleys; retrieved from http://havewheelchairwilltravel.net/coles-additional-needs-trolleys/; retrieved on Mar. 11, 2015.

* cited by examiner

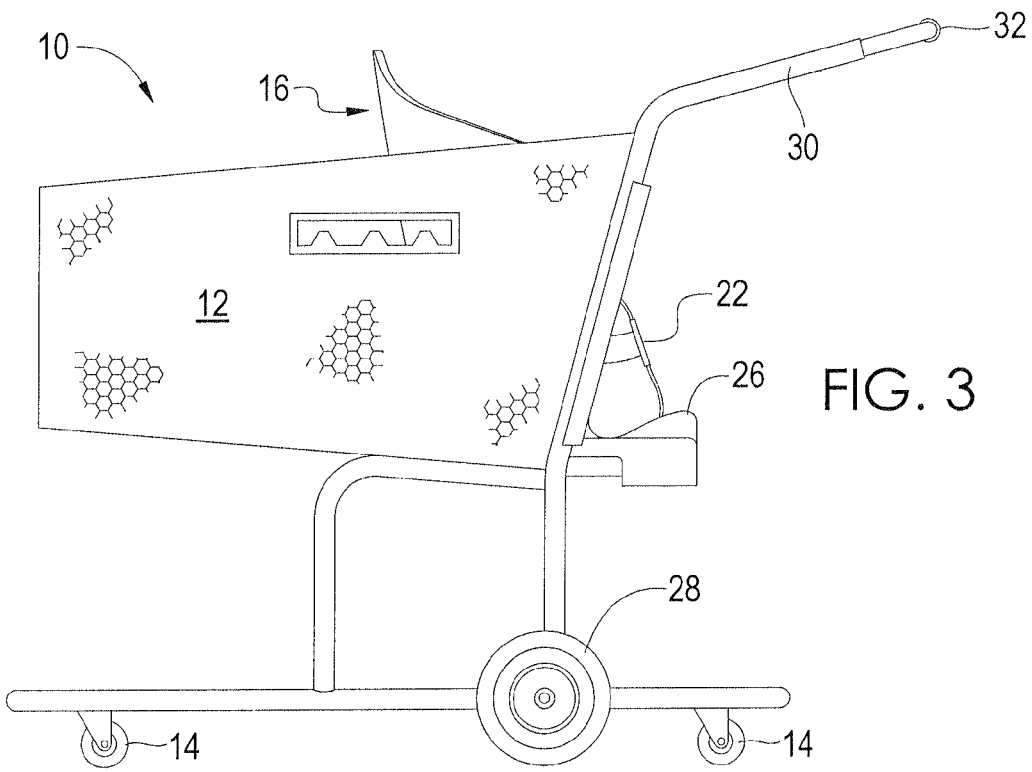
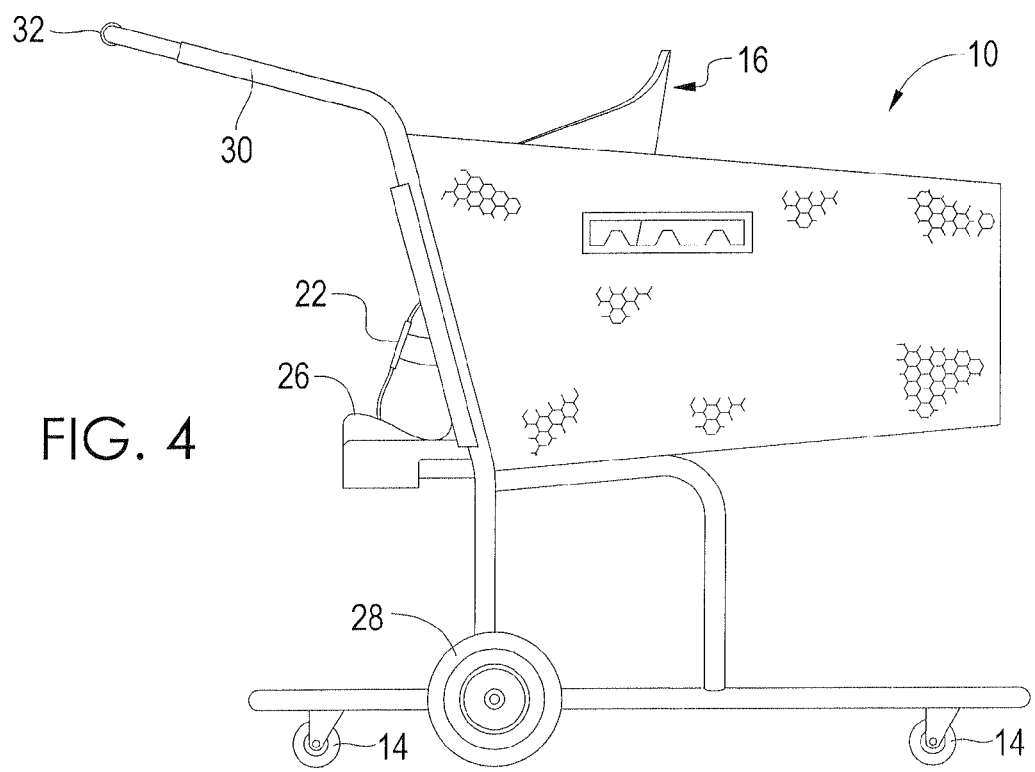

CARRYING CART ACCOMMODATION FOR SPECIAL-NEEDS RIDER

CROSS-REFERENCE TO RELATED APPLICATIONS

This application claims the benefit of U.S. Provisional Application No. 61/354,353, filed Jun. 14, 2010 entitled "Carrying Cart Accommodation for Special Needs Rider."

BACKGROUND

A. Field of the Disclosure

The present disclosure relates generally to accommodations for safely providing for a special-needs rider. More specifically, the disclosure relates to such an accommodation for use on a carrying cart. Methods and uses of the accommodation are also provided.

B. Background

In the following discussion, certain documents or technologies may be described for background and introductory purposes. Nothing contained herein is to be construed as an "admission" of prior art. Applicant expressly reserves the right to demonstrate, where appropriate, that the articles and methods referenced herein do not constitute prior art under the applicable statutory provisions.

A significant fraction of the population is physically incapable of, or challenged in, safely walking on their own or maintaining sufficient balance or posture to remain safely in an upright sitting position. Various disorders and injuries can render a person challenged in their efforts to, or unable to walk at all or for sustained periods (examples being ataxia, hypotonia, Prader-Willi syndrome, spasticity, vertigo, muscular dystrophy, other neuromuscular disorders, fragile X-associated tremor/ataxia, brain injury, bone fractures, sprains, and seizure disorders). Other disorders can render a person unable to maintain an upright sitting position for a sustained period (examples being hypotonia, Prader-Willi syndrome, spasticity, muscular dystrophy, vertigo, brain injury, and seizure disorders). Some disorders challenge or prevent a person from safely navigating, even if able to walk for sustained periods of time, or require constant supervision (examples being mental impairment, Down's syndrome, fragile X syndrome, Rett syndrome, blindness, vertigo, and autism spectrum disorders). For the purposes of this disclosure, persons with such disorders or similar difficulties are referred to as having "special needs." People with special needs typically benefit from the use of wheeled apparatus. The classic example of such a wheeled apparatus is a wheelchair.

Wheeled apparatus known in the art have several unresolved problems, particularly if the rider is not able to propel or direct the wheelchair without assistance from another person. The assistant cannot engage in other tasks while pushing and steering the chair, due to its mass and the need to pay careful attention to the wellbeing of the rider. This poses a particular problem if the assistant must manipulate another wheeled apparatus, such as a carrying cart. Carrying carts, such as shopping carts, luggage carts, hand trucks, and laundry carts, are widespread and indispensible in transporting heavy, numerous, or unwieldy objects for short distances. However, it is virtually impossible to push a carrying cart and a wheelchair at the same time.

Some carrying carts currently include chairs or other accommodation for small children. Such accommodations prevent mobile children from roving and allow children not yet able to walk to accompany a caretaker while shopping or otherwise moving items in the cart. However, such accommodations are not adequate for persons with special needs with an inability to sit upright when unsupported, In addition, a person with special needs may be of any age and any size, whereas cart chairs for children are designed only to support a small child with sufficient muscle tone to sit upright.

Consequently, there is a long-felt but unmet need in the art for an effective means to safely propel a special needs rider (potentially of any age and size) while simultaneously handling a carrying cart.

FIGURES

FIG. 3 shows a side view of one embodiment of the cart with push handles in a closed position.

FIG. 4 shows an alternate side view of one embodiment of the cart with push handles in a closed position.

DESCRIPTION

A. Summary of Invention

In one aspect, the instant disclosure provides a cart including a push handle moveable from a first position to a second position; and a chair which further includes (i) a seat facing the push handle, the seat further comprising an abduction block; (ii) a safety belt; (iii) a backrest extending upwardly from the seat; and (iv) a foot rest and one or more wheels.

In another aspect, a shopping cart suitable for carrying a special needs rider is provided including a generally rectangular cargo basket, four swiveling wheels, a chair further comprising: a rearwardly facing seat further comprising an abduction block, said seat inclined at approximately a five degree angle from a horizontal axis downwardly toward a backrest, which backrest extends generally upward from the seat and is reclined at approximately a five degree angle from a vertical axis, a five point restraint safety belt and a foot rest positioned to support the rider's feet when positioned in the seat; one or more push handle moveable from a first position to a second position by pivoting around a roughly horizontal axis; and two load bearing wheels positioned substantially in the same vertical plane as the rider.

B. Detailed Description

Unless stated otherwise, all examples herein are intended to be non-limiting. Except where the text explicitly specifies otherwise, all reference to the male should be construed to encompass the female, all reference to the female should be construed to encompass the male, all references to the plural should be construed to encompass the singular, and all references to the singular should be construed to encompass the plural. The term "including" should be construed to mean "including, but not limited to."

Figure 1:
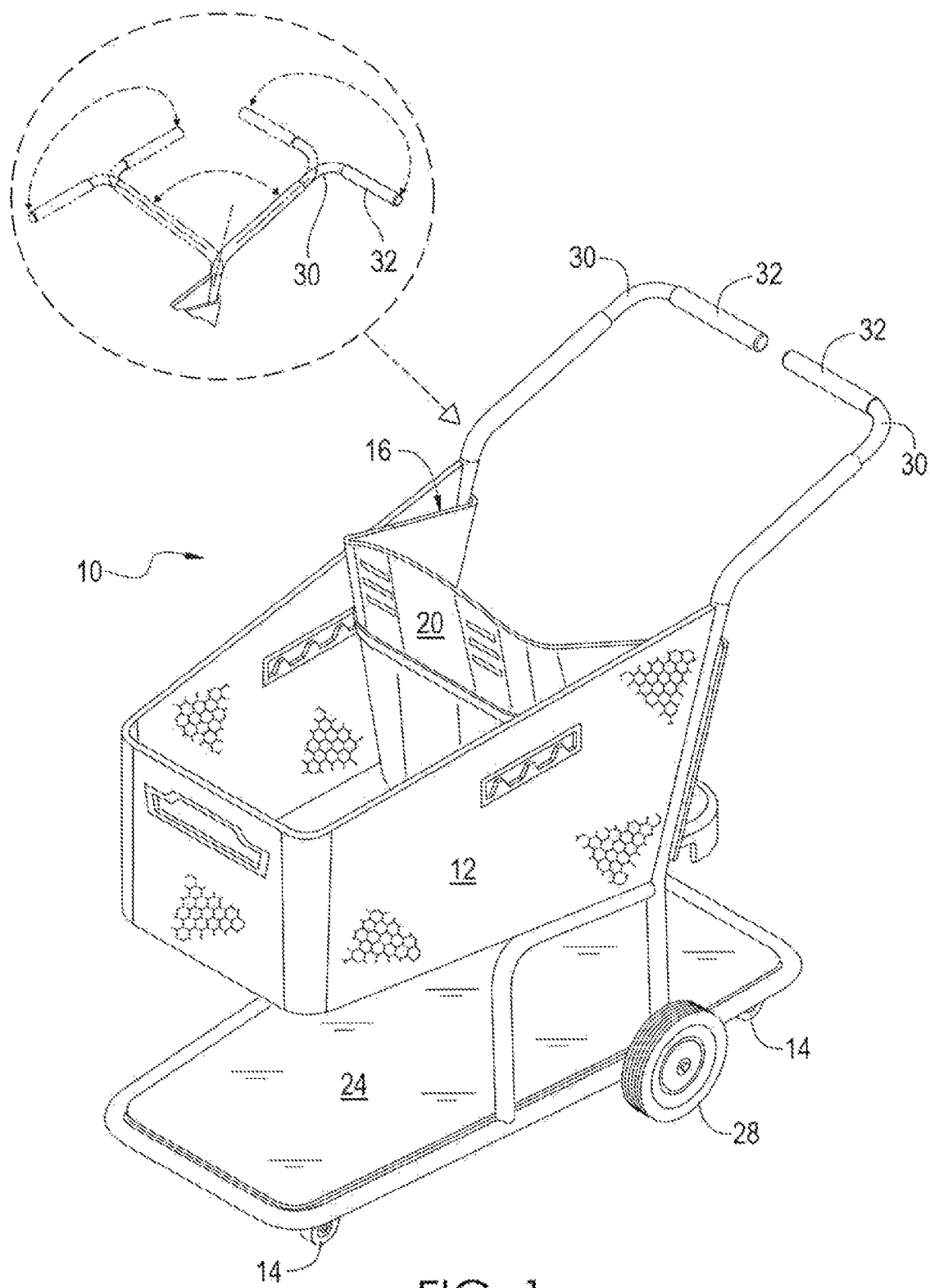
FIG. 1 shows a front perspective view of one embodiment of the cart with push handles in a closed position.
Figure 2:
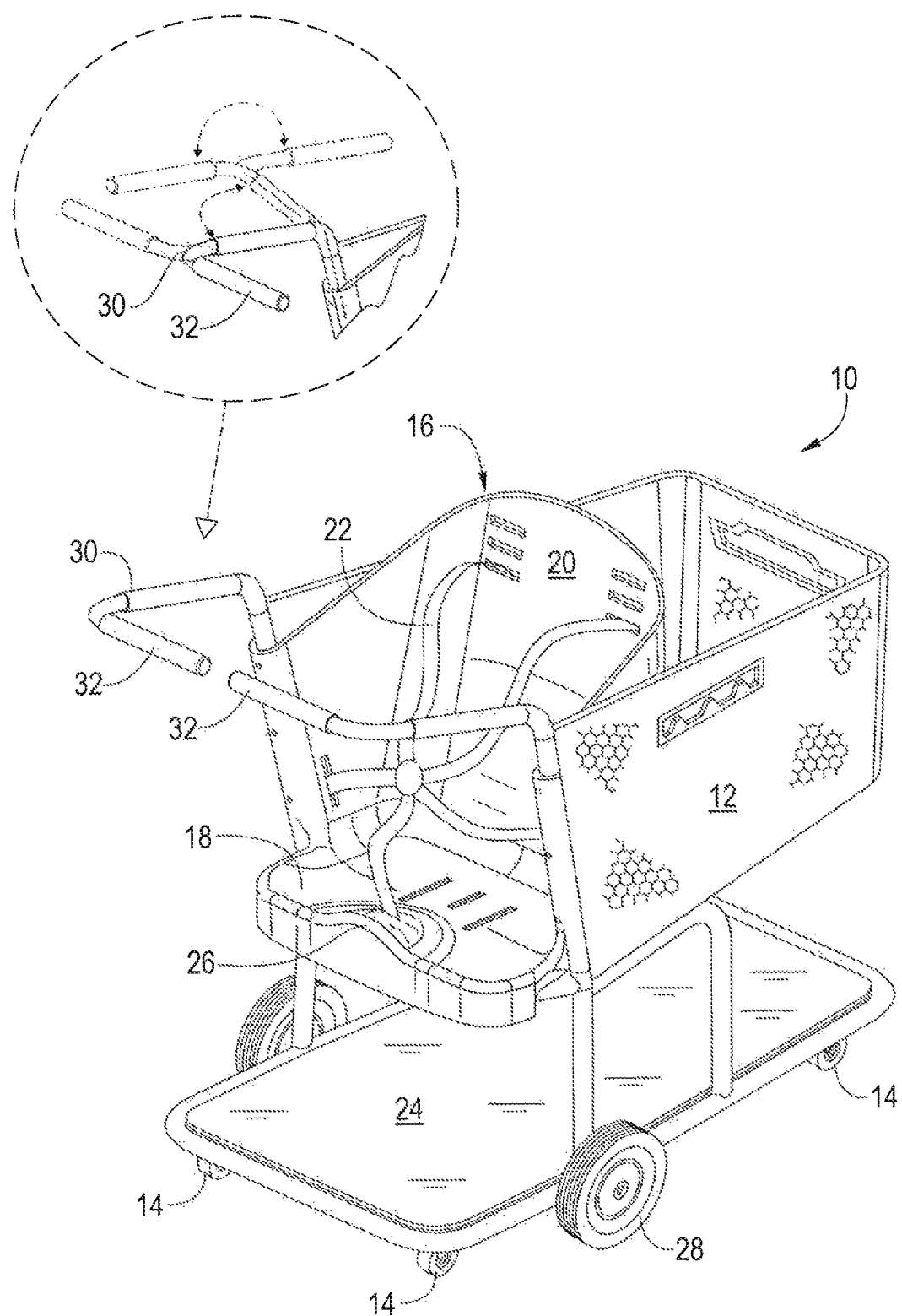
FIG. 2 shows a rear perspective view of one embodiment of the cart with push handles in a closed position.
Figure 5:
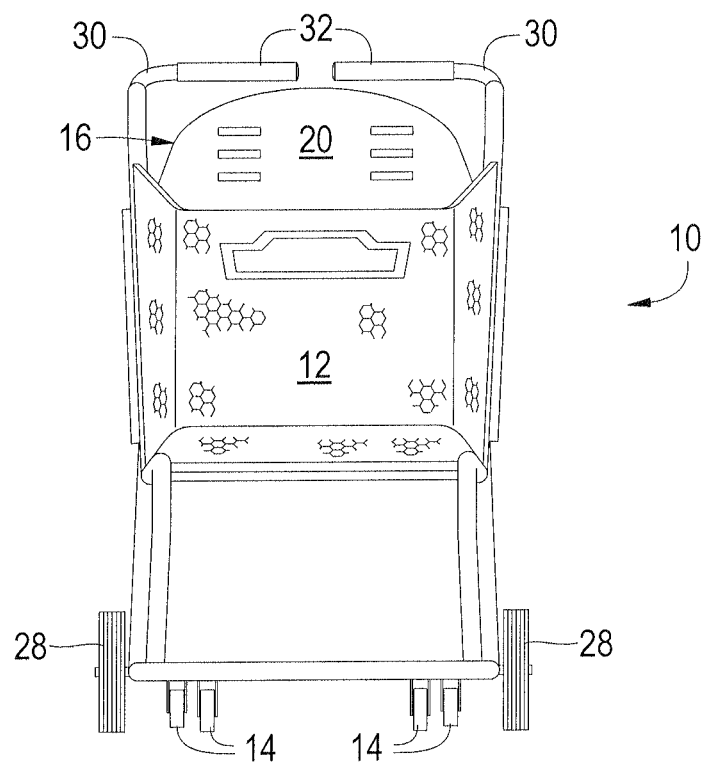
FIG. 5 shows a front view of one embodiment of the cart with push handles in a closed position.
Figure 6:
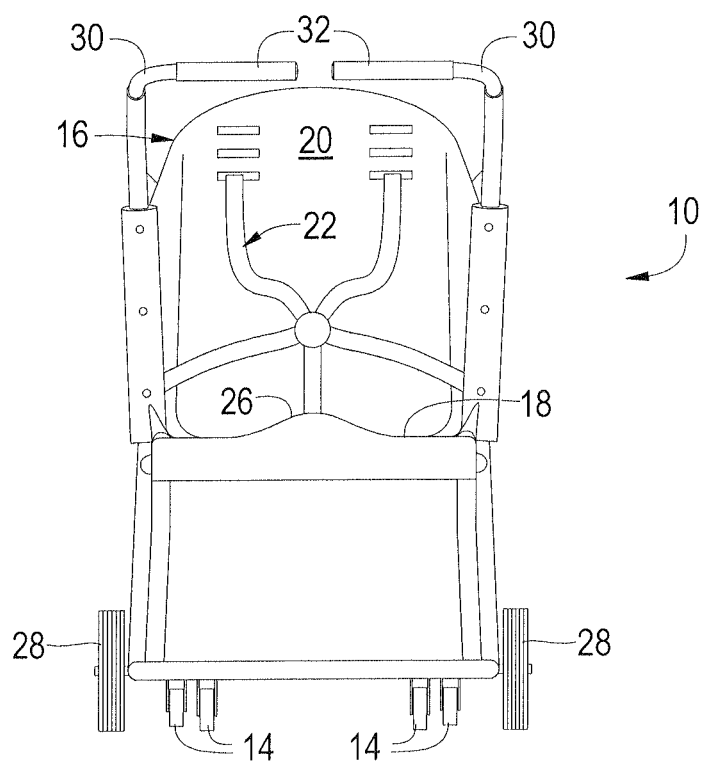
FIG. 6 shows a rear view of one embodiment of the cart with push handles in a closed position.
Figure 7:
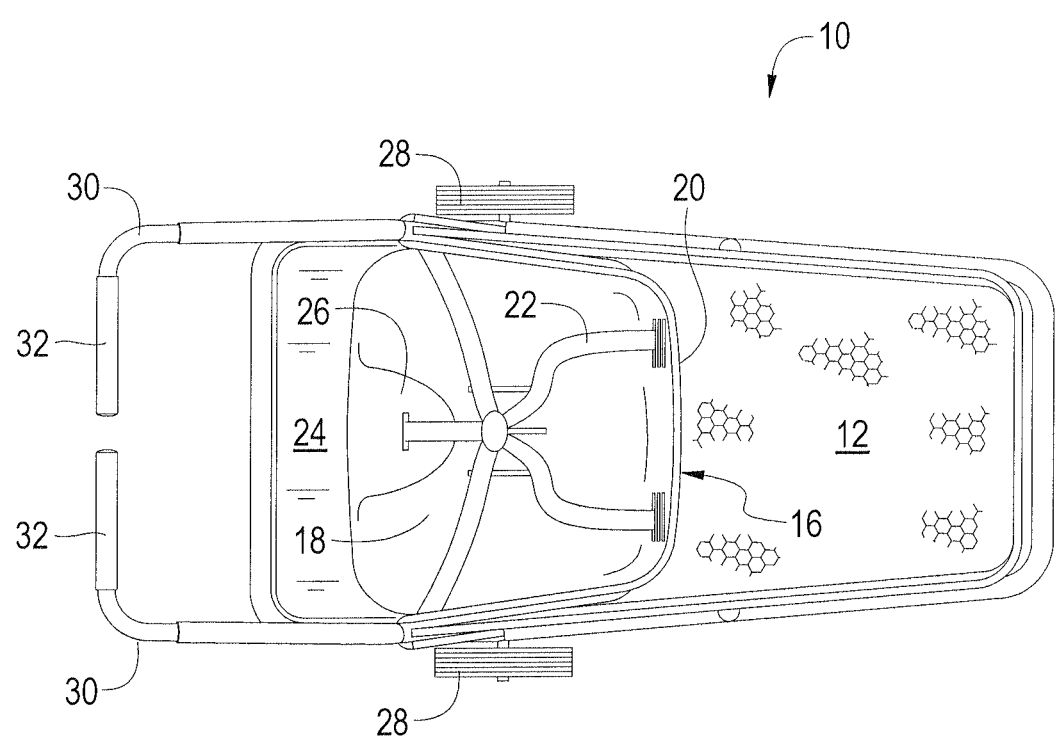
FIG. 7 shows a top view of one embodiment of the cart with push handles in a closed position.
Figure 8:
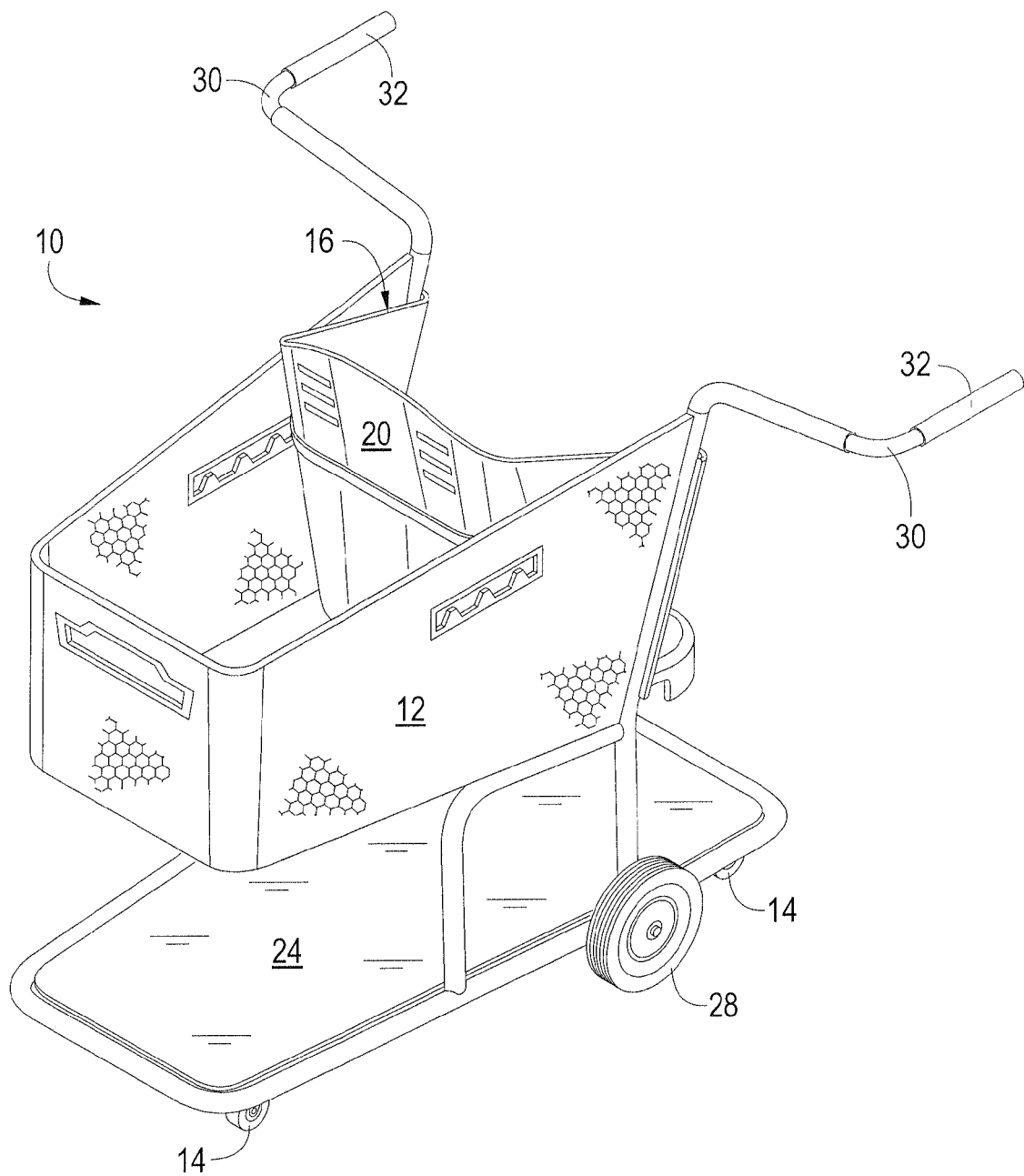
FIG. 8 shows a front perspective view of one embodiment of the cart with push handles in an open position.
Figure 9:
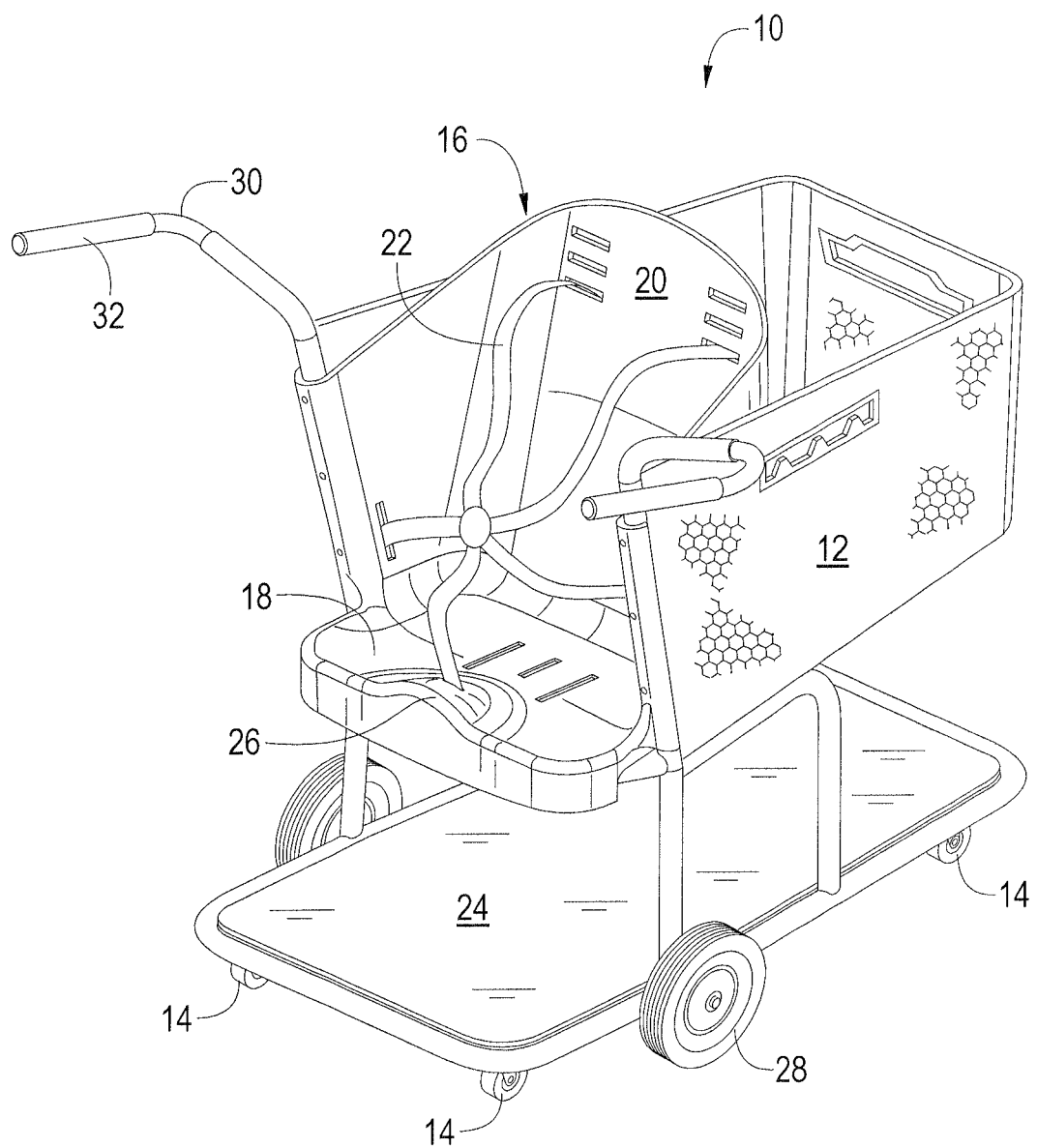
FIG. 9 shows a rear perspective view of one embodiment of the cart with push handles in an open position.
Figure 10:
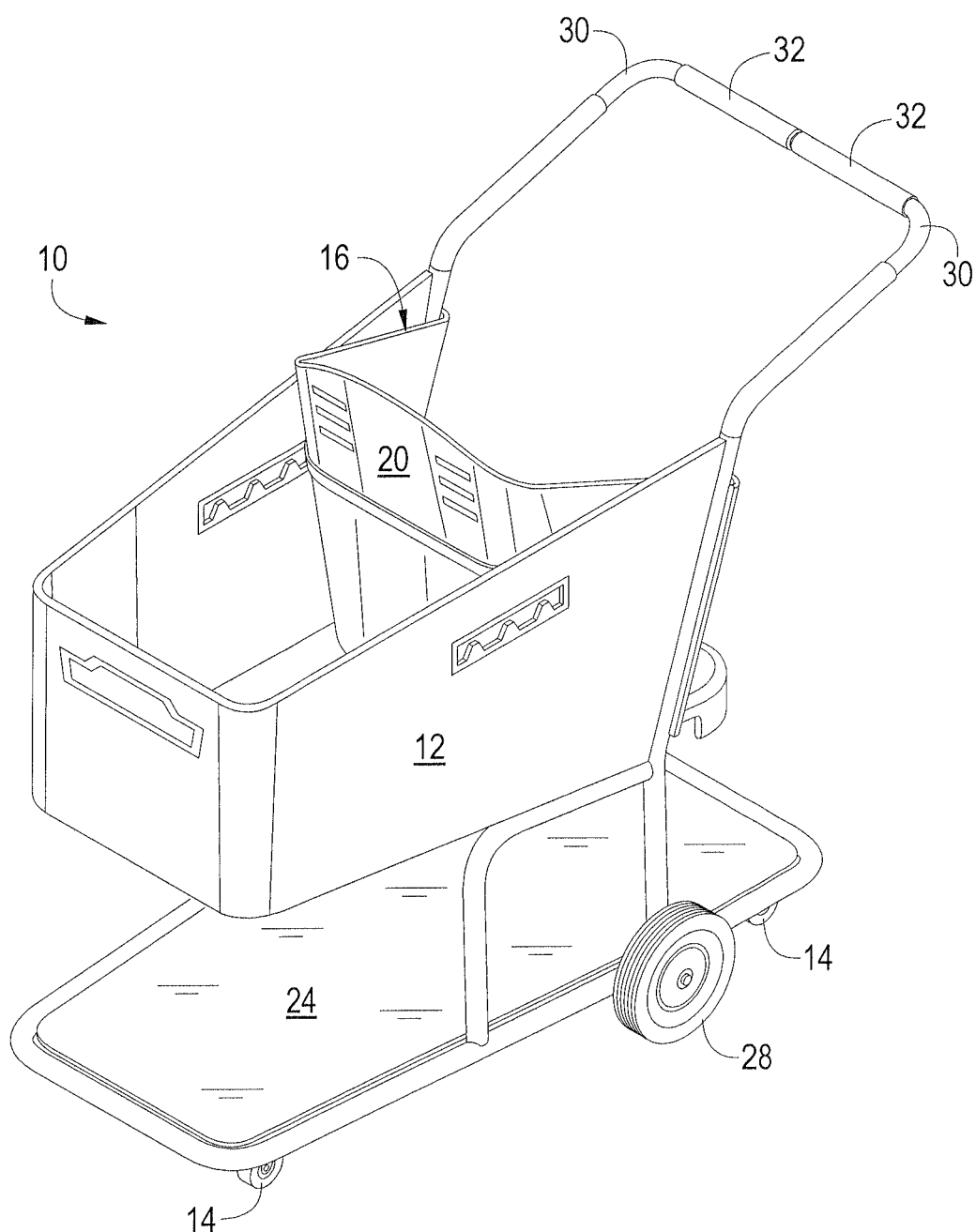
FIG. 10 shows a front perspective view of an alternate embodiment of the cart with push handles in a closed position.
Figure 11:
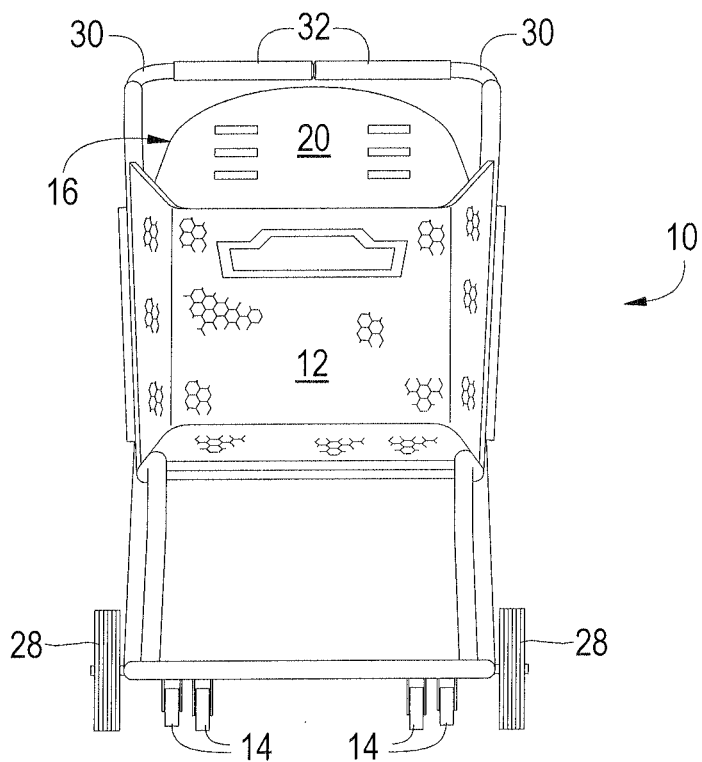
FIG. 11 shows a front view of an alternate embodiment of the cart with push handles in a closed position.
Figure 12:
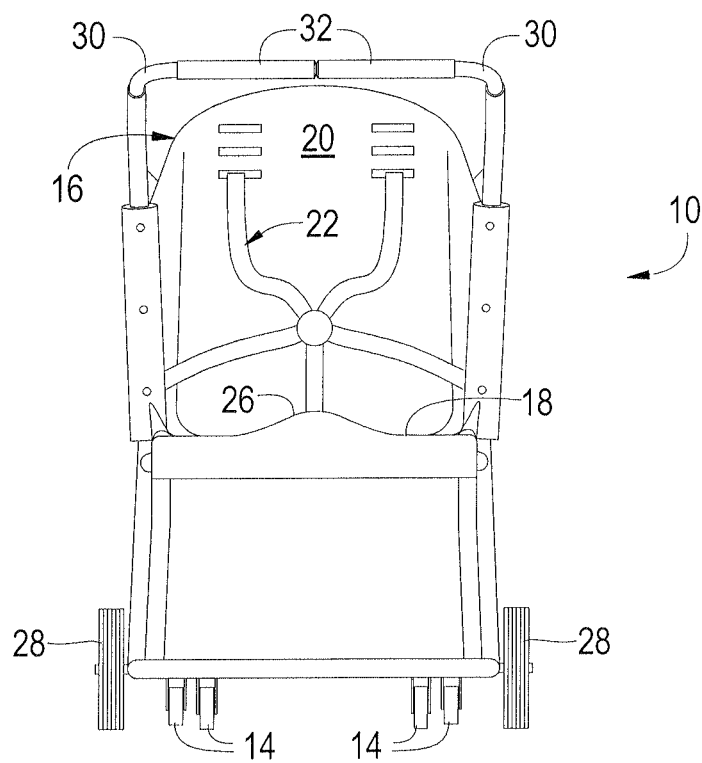
FIG. 12 shows a rear view of an alternate embodiment of the cart with push handles in a closed position.

All references made herein are to FIGS. 1-12. A number of the problems above and others are addressed by means of a carrying cart 10 having a chair for a special-needs passenger. The cart 10 comprises a basket 12, a pair of swiveling wheels mounted below the basket 14, a chair 16 comprising a seat 18 and backrest 20, a five-point restraint safety belt 22, a footrest 24, an abduction block 26 on the seat 18, and a pair of load-bearing wheels 28 positioned generally beneath the rider. In some embodiments, the five-point restraint safety belt 22 and the abduction block 26 may be omitted.

Some embodiments of the seat 18 will be inclined downwardly toward the backrest 20, to cause the rider to naturally settle back into the chair 16 while riding. The angle will depend on the dimensions of the intended rider. Some embodiments of the inclined seat 18 will be inclined by at least 5°. An exemplary embodiment comprises a seat 18 that is inclined about 5° or exactly 5°. The seat 18 may be made of any suitable material known in the art. In some embodiments the surface of the seat 18 will comprise a high-friction surface that will aid the rider in maintaining an upright posture in the chair 16, and will prevent involuntary slouching.

The seat 18 comprises an abduction block 26. An abduction block 26 is a prominence positioned in the middle of the front edge of a seat 18, in front of the rider's crotch. The block 26 serves as a barrier to slouching, and provides an object against which the rider can brace his legs to maintain an upright posture. The abduction block 26 will be sized according to the dimensions of the intended rider.

The backrest 20 extends upward from the seat 18. The backrest 20 will generally extend to at least the level of the shoulder blades of the intended rider. Some embodiments of the backrest 20 extend to the level of the intended rider's head. For example, a backrest 20 for a larger child may be about a minimum of 40" (101.6 cm) high. Such embodiments have the advantage of providing head support for the rider, whereas embodiments with a lower backrest have the advantage of lower weight. Some embodiments of the chair 16 further comprise a separate headrest above the backrest 20. Some embodiments of the backrest 20 are reclined to provide support to the rider's back. Embodiments of the backrest 20 that recline also have the advantage of preventing the rider from flopping forward. The reclination of the backrest 20 will generally be at least 5°. In some embodiments it is about 5° or exactly 5°. Like the seat 18, the backrest 20 may also comprise a high-friction surface.

The seat 18 is generally broader and deeper than would be the seat 18 of a chair for a person without special needs. Such larger dimensions aid in accessibility and stability. For example, a seat 18 for a larger rider with special needs may be about a minimum of 48" (122 cm) deep by 22" (55.9 cm) wide (or about these dimensions).

The footrest 24 is positioned to support the rider's feet without effort on the part of the rider, preventing the rider's legs from dangling or dragging. This prevents the rider's legs and feet from snagging or impacting nearby objects or from interfering with the wheels of the cart 10. This also prevents the rider's legs from becoming "deadweight" which could potentially pull the rider's body down into a slouching position. The footrest 24 may extend under the body of the cart 10 to provide additional space for cargo.

In some embodiments of the cart 10, the chair 16 is positioned so that the rider faces the assistant while the assistant pushes the cart 10. In embodiments in which the assistant pushes the cart 10 from behind, the chair 16 will face the rear of the cart 10 (facing the assistant). This allows the assistant to visually monitor the well-being of the rider while conducting the cart 10. However, such a configuration requires that the push-handle 30 of the cart 10 be configured to allow the rider to mount and dismount the chair 16 without obstruction from the handle 30. Some embodiments of the cart 10 comprise a retractable push-handle 30 which, when retracted, allows the rider to easily mount and dismount the chair 16. In such embodiments the handle 30 will be between the rider and the assistant in its extended position, but in its retracted position will either not be between the rider and the assistant.

Some embodiments of the push-handle 30 comprise one or more handles 32 that retract by swinging around a roughly vertical axis, allowing the handle 32 to be off to the side or behind in the retracted position. Other embodiments of the push-handle 30 comprise one or more handles 32 that retract by swinging around a roughly horizontal axis, allowing the handles 32 to be above or behind the rider in its retracted position.

Some embodiments of the cart 10 may further comprise a retractable safety bar 34 positioned in front of the rider adapted to provide further additional support, securement and safety for the rider preventing the rider from falling or otherwise being injured. The retractable safety bar 34 is configured to allow the rider to easily mount and dismount the chair 16 when the bar 34 is retracted. When extended, the bar 34 is positioned to prevent the rider from falling out of the seat 18 should the restraints and other measures fail.

In some embodiments of the cart 10, the retractable safety bar 34 and the push-handle 30 may be incorporated into the same structure if desired. In such embodiments the structure comprises handles 32 at a convenient position for the assistant, such as allowing the assistant to grip with palms facing inward or with palms facing downward. The structure will further comprise a section that is positioned to prevent the rider from falling out of the seat 18 should the restraints and other measures fail.

The handle 30, the bar 34, or both may further comprise a lock to prevent them from shifting from the extended to retracted position unintentionally. Any locking mechanism known in the art may serve this purpose. Both the handle 30 and the bar 34 will be positioned at a sufficient distance from the rider's head to prevent the rider's head from impacting it due to weak neck musculature.

The cart 10 comprises a plurality of wheels that permit the cart 10 to be effectively maneuvered and adequately support the rider and any cargo. In one embodiment, a pair of load-bearing wheels 28 may be located substantially the passenger, as in many embodiments the rider will be the heaviest object in the cart 10. In one embodiment, the load-bearing wheels 28 are located in the same, or nearly the same, vertical plane as the rider. In one embodiment, the load-bearing wheels 28 are located in the same, or nearly the same, vertical plane as the rider's center of gravity. In some embodiments, the load-bearing wheels 28 may be moved either forward or rearward of either the rider's center of gravity or the vertical plane of the rider. Further, the location of the load-bearing wheels 28 may be adjusted as to provide greater stability for the cart 10 in combination with any other additional wheels 14 that are present.

The load-bearing wheels 28 will typically be supported by an axle 36, and will generally be larger than typical cart wheels. For example, 8" (20.3 cm) axle-mounted wheels are adequate to support a cart 10 for larger children and most adults. Any type of bearing with adequate load capacity may be substituted for the axle 36, as is known in the art. For added stability the load-bearing wheels 28 may be fixed, such that they neither turn nor swivel. In one embodiment, if the load-bearing wheels 28 are fixed, it may be advantageous to place them at least slightly forward of the rear of the cart 10 there are additional wheels 14 (as described below) also present.

The cart 10 will further comprise one or more additional wheels that may have less load-bearing capacity. For added maneuverability, the additional wheels 14 may swivel. At least one such additional wheel should be positioned below or in front of the basket 12 to provide balance to the cart 10. Other wheels may be positioned as known in the art to provide support and maneuverability according to the cart's function. The additional wheels may be for example 5" (12.7 cm) diameter swiveling wheels. In one exemplary embodiment, in addition to the load bearing wheels, the cart 10 comprises a front pair of swiveling wheels 14 and a rear pair of swiveling wheels 14. The rear pair may be closer to the rear of the cart than are the load-bearing wheels. In another exemplary embodiment, the car comprises only a front pair of swiveling wheels 14 (the load-bearing wheels 28 being positioned near the rear of the cart 10).

The cart 10 further comprises a cargo basket 12. The cargo basket 12 may take many forms depending on the function of the cart 10. For example, if the cart 10 is a shopping cart, the cargo basket 12 may be generally rectangular, with a cargo capacity of about 100 pounds (45.5 kg) and displacing upwards of about 10,000 cubic inches (163.9 L). If the cart 10 is an airport luggage cart, the "cargo basket" will be a forward support member, and may or may not include a surrounding structure. The basket 12 may be adapted to carry a wide variety of types of cargo, as is widely known in the art.

The dimensions of the chair 16 and footrest 24 will vary according to the anticipated size of rider. Such parts may be scaled as necessary for children of various ages and adults.

The foregoing description illustrates and describes the processes, machines, manufactures, compositions of matter, and other teachings of the present disclosure. Additionally, the disclosure shows and describes only certain embodiments of the processes, machines, manufactures, compositions of matter, and other teachings disclosed, but, as mentioned above, it is to be understood that the teachings of the present disclosure are capable of use in various other combinations, modifications, and environments and is capable of changes or modifications within the scope of the teachings as expressed herein, commensurate with the skill and/or knowledge of a person having ordinary skill in the relevant art. The embodiments described hereinabove are further intended to explain certain best modes known of practicing the processes, machines, manufactures, compositions of matter, and other teachings of the present disclosure and to enable others skilled in the art to utilize the teachings of the present disclosure in such, or other, embodiments and with the various modifications required by the particular applications or uses. Accordingly, the processes, machines, manufactures, compositions of matter, and other teachings of the present disclosure are not intended to limit the exact embodiments and examples disclosed herein.

I claim:

1. A cart comprising:
   a. a first push handle adapted to be moveable from a first position to a second position and a second push handle adapted to be moveable from a first position to a second position, wherein each push handle comprises,
      i. a lateral support post rising upward from the base of the cart;
      ii. a rearward handle segment that extends rearward from the top of the lateral support post at approximately a 90° angle; and
      iii. a horizontal handle segment that extends horizontally across the cart from the rearward handle segment at approximately a 90° angle;
   b. a chair which further comprises:
      i. a seat with a high friction surface, the seat facing the first and second push handle, the seat further comprising an abduction block;
      ii. a safety belt;
      iii. a backrest with a high friction surface, the backrest extending upwardly from the seat, the backrest comprising a rear facing portion and a forward facing portion; and
      iv. a lower platform comprising a foot rest, wherein said foot rest is positioned below the seat to facilitate a passenger resting their feet upon the foot rest when seated in the chair, the foot rest forming a barrier across the width of the cart to prevent the passenger's feet from contacting the floor or ground;
   c. six (6) wheels, wherein two (2) load bearing wheels are located in the same vertical plane as a passenger's center of gravity while seated in the seat and the two (2) load bearing wheels are larger than the four (4) other wheels, each of the two (2) load bearing wheels having a lateral location outward of the four (4) other wheels, and wherein the lower platform extends rearwardly beyond the most rearward pair of the four (4) other wheels; and
   d. a generally rectangular cargo basket comprising four (4) walls, wherein three (3) walls extend from a floor and the forward facing portion of the seat backrest forms the fourth wall of the cargo basket.

2. The cart of claim 1 wherein the four (4) other wheels are swiveling wheels.

3. The cart of claim 1 wherein the cart further comprises a harness which is a five point restraint safety belt.

4. The cart of claim 1 wherein the seat is inclined downwardly towards the backrest at approximately a five (5) degree angle from a horizontal axis.

5. The cart of claim 1 wherein the backrest is reclined at approximately a five (5) degree angle from a vertical axis.

6. The cart of claim 1 wherein the chair further comprises a headrest located above the backrest.

7. The cart of claim 1 wherein the push handles may be locked in either the first or the second position.

8. A cart comprising:
   a. a chair which comprises,
      i. a seat with a high friction surface, the seat facing the first and second push handles;
      ii. a backrest with a high friction surface, the backrest extending upwardly from the seat, the backrest comprising a rear facing surface and a forward facing surface; and
      iii. a foot rest, wherein said foot rest is positioned below the seat to facilitate a passenger resting their feet upon the foot rest when seated in the chair, the foot rest including a uniformly flat top surface having a common plane and no openings extending therethrough and forming a barrier across the width of the cart to prevent the passenger's feet from contacting the floor or ground and wherein the foot rest extends rearwardly of a rear edge of the seat;

b. a first and a second push handle adapted to be moveable from a first position to a second position, wherein the first push handle and second push handle are moveable independently of one another around both a roughly vertical axis and a roughly horizontal axis such that each of the first and second push handles do not extend in the rearward direction when in the second position for facilitating access to the chair by the passenger, wherein each push handle comprises,
  i. a lateral support post rising upward from the base of the cart;
  ii. a rearward handle segment that extends rearward from the top of the lateral support post at approximately a 90° angle; and
  iii. a horizontal handle segment that extends horizontally across the cart from the rearward handle segment at approximately a 90° angle;

c. a plurality of wheels, wherein two (2) load bearing wheels are located in the same vertical plane as the passenger's center of gravity while seated in the seat and wherein a lower platform extends rearwardly beyond the load bearing wheels, and each of the two (2) load bearing wheels having a lateral location outward of said lower platform; and d. a generally rectangular cargo basket comprising four (4) enclosure panels, wherein three (3) enclosure panels that extend from a floor and the rear facing surface of the seat backrest forms the fourth enclosure panel.

9. The cart of claim 8 wherein the four (4) other wheels are swiveling wheels.

10. The cart of claim 8 wherein the cart further comprises a harness which is a five point restraint safety belt.

11. The cart of claim 8 wherein the seat is inclined downwardly towards the backrest at approximately a five (5) degree angle from a horizontal axis.

12. The cart of claim 8 wherein the backrest is reclined at approximately a five (5) degree angle from a vertical axis.

13. The cart of claim 8 wherein the chair further comprises a headrest located above the backrest.

14. The cart of claim 8 wherein the push handles may be locked in either the first or the second position.

15. A cart comprising:
a. a chair which comprises,
  i. a seat with a high friction surface, the seat facing the first and second push handles;
  ii. a backrest with a high friction surface, the backrest extending upwardly from the seat, the backrest comprising a rear facing surface and a forward facing surface; and
  iii. a foot rest, wherein said foot rest is positioned below the seat to facilitate a passenger resting their feet upon the foot rest when seated in the chair, the foot rest including a uniformly flat top surface having a common plane and no openings extending therethrough and forming a barrier across the width of the cart to prevent the passenger's feet from contacting the floor or ground and wherein the foot rest extends rearwardly of a rear edge of the seat;

b. a first and a second push handle adapted to be moveable from a first position to a second position, wherein the first push handle and second push handle are moveable independently of one another around both a roughly vertical axis and a roughly horizontal axis such that each of the first and second push handles do not extend in the rearward direction when in the second position for facilitating access to the chair by the passenger, wherein each push handle comprises,
  i. a lateral support post rising upward from the base of the cart;
  ii. a rearward handle segment that extends rearward from the top of the lateral support post at approximately a 90° angle; and
  iii. a horizontal handle segment that extends horizontally across the cart from the rearward handle segment at approximately a 90° angle;

c. a plurality of wheels, wherein two (2) load bearing wheels are located in the same vertical plane as the passenger's center of gravity while seated in the seat and wherein a lower platform extends rearwardly beyond the load bearing wheels; and d. a generally rectangular cargo basket comprising four (4) enclosure panels, wherein three (3) enclosure panels that extend from a floor and the rear facing surface of the seat backrest forms the fourth enclosure panel.

16. The cart of claim 15 wherein the four (4) other wheels are swiveling wheels.

17. The cart of claim 15 wherein the cart further comprises a harness which is a five point restraint safety belt.

18. The cart of claim 15 wherein the seat is inclined downwardly towards the backrest at approximately a five (5) degree angle from a horizontal axis.

19. The cart of claim 15 wherein the backrest is reclined at approximately a five (5) degree angle from a vertical axis.

20. The cart of claim 15 wherein the push handles may be locked in either the first or the second position.

* * * * *